US012018570B2

(12) United States Patent
Becker et al.

(10) Patent No.: US 12,018,570 B2
(45) Date of Patent: Jun. 25, 2024

(54) GUIDE VANE WHEEL OF A TURBOMACHINE

(71) Applicant: Rolls-Royce Deutschland Ltd & Co KG, Blankenfelde-Mahlow (DE)

(72) Inventors: Bernd Becker, Berlin (DE); Henner Schrapp, Rangsdorf (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 18/252,799

(22) PCT Filed: Oct. 29, 2021

(86) PCT No.: PCT/EP2021/080108

§ 371 (c)(1),
(2) Date: May 12, 2023

(87) PCT Pub. No.: WO2022/101029

PCT Pub. Date: May 19, 2022

(65) Prior Publication Data

US 2023/0417158 A1 Dec. 28, 2023

(30) Foreign Application Priority Data

Nov. 13, 2020 (DE) ..................... 10 2020 130 038.7

(51) Int. Cl.
*F01D 21/00* (2006.01)
*F01D 5/20* (2006.01)
(Continued)

(52) U.S. Cl.
CPC ........... *F01D 21/003* (2013.01); *F01D 9/041* (2013.01); *F01D 5/20* (2013.01); *F01D 5/30* (2013.01);
(Continued)

(58) Field of Classification Search
CPC ... F01D 5/045; F01D 5/20; F01D 5/30; F01D 5/303; F01D 5/3069; F01D 17/14;
(Continued)

(56) References Cited

U.S. PATENT DOCUMENTS 1,534,721 A 4/1925 Fritz
7,097,420 B2 8/2006 Cormier et al.
(Continued)

FOREIGN PATENT DOCUMENTS

DE 102010045869 A1 2/2012
DE 102015213786 A1 1/2017

OTHER PUBLICATIONS

German Search Report dated Jun. 14, 2021 from counterpart German Patent Application No. 10 2020 130 038.7.

*Primary Examiner* — Binh Q Tran
(74) *Attorney, Agent, or Firm* — SHUTTLEWORTH & INGERSOLL, PLC; Timothy J. Klima

(57) ABSTRACT

A guide vane wheel of a turbomachine, has a plurality of guide vanes, forming a blade row extending radially inward in a flow path of the turbomachine, and two borescope accesses. The guide vanes form two segments each with a plurality of guide vanes circumferentially spaced apart, with the two segments having the same, constant cascade pitch and the two segments spaced such that the respective outermost guide vane adjacent to the respective other segment has an enlarged spacing in the circumferential direction from the adjacent guide vane of the other segment equal to 1.3 to 1.7 times the cascade pitch, the sum of the increased spacings being equal to 3 times the cascade pitch. The increased distance between the respective two adjacent outermost guide vanes of the two segments creates an enlarged vane passage between these guide vanes where the borescope accesses are formed.

12 Claims, 6 Drawing Sheets

(51) Int. Cl.
*F01D 5/30* (2006.01)
*F01D 9/04* (2006.01)
*F01D 17/14* (2006.01)
*F01D 17/18* (2006.01)

(52) U.S. Cl.
CPC .............. *F01D 5/303* (2013.01); *F01D 17/14* (2013.01); *F01D 17/18* (2013.01); *F05D 2240/12* (2013.01); *F05D 2240/30* (2013.01); *F05D 2240/301* (2013.01); *F05D 2270/804* (2013.01)

(58) Field of Classification Search
CPC . F01D 17/18; F01D 9/04; F01D 9/041; F01D 9/042; F01D 9/065; F01D 21/003; F01D 25/246
See application file for complete search history.

(56) References Cited

U.S. PATENT DOCUMENTS

| | | | | |
|---|---|---|---|---|
| 10,526,894 | B1 * | 1/2020 | Rose | F04D 29/544 |
| 2010/0263183 | A1 | 10/2010 | Holmes et al. | |
| 2013/0167375 | A1 | 7/2013 | Roesing et al. | |
| 2016/0333729 | A1 * | 11/2016 | Miller | F04D 27/0292 |
| 2017/0218841 | A1 * | 8/2017 | Nestico | F01D 17/14 |
| 2018/0363675 | A1 * | 12/2018 | Kroger | F02K 3/06 |
| 2020/0079513 | A1 * | 3/2020 | Pastouchenko | F02K 1/18 |
| 2020/0271010 | A1 * | 8/2020 | Breeze-Stringfellow | F01D 17/16 |
| 2022/0065129 | A1 * | 3/2022 | Lewis | F01D 9/065 |

* cited by examiner

GUIDE VANE WHEEL OF A TURBOMACHINE

This application is the National Phase of International Application PCT/EP2021/080108 filed Oct. 29, 2021 which designated the U.S.

This application claims priority to German Patent Application No. 102020130038.7 filed Nov. 13, 2020, which applications are incorporated by reference herein.

The invention relates to a guide vane wheel of a turbomachine according to the present disclosure.

A borescope (also known as an endoscope) is an optical instrument used to aid in the visual inspection of cavities that are difficult to access. It consists of a rigid or flexible shaft with an eyepiece or display at one end, and a lens or camera at the other, connected by an optical or electrical system in between. Borescopes within the meaning of the present disclosure also refer to instruments that have a rigid or flexible shaft and are designed to carry out minor repairs with the aid of micro-tools or that are designed to take gas samples and/or carry out chemical analyses.

It is known to use borescopes in aviation for the maintenance of aircraft engines, for example for an optical inspection of the components in the flow duct of a gas turbine or on a test bench to measure the temperature of the flow in the flow duct of a gas turbine, with one or more borescopes protruding into the flow duct.

To provide access for a borescope, borescope accesses are typically formed between two guide vanes of the row of vanes of a guide vane wheel or stator of a compressor stage or turbine stage. The borescope accesses are designed in such a manner that they enable a borescope to be pushed into the engine without first dismantling the engine. The borescope accesses use the pitch spacing between two adjacent guide vanes.

The development of modern turbofan aircraft engines is characterized by efforts to realize ever greater bypass ratios. This goes hand in hand with increasingly smaller core engines. With increasingly smaller core engines, the cascade pitch of the guide wheels in the compressor of a gas turbine engine is also becoming smaller. This can lead to the pitch spacing present between two guide vanes no longer being sufficient to form borescope accesses therein for accommodating borescopes. The shaft of the borescope typically has a standardized outer diameter, which is necessary in order to deliver images with a quality that meets defined requirements.

It is known from DE 10 2015 213 786 A1 to design at least one of the guide vanes in a compressor of a gas turbine engine in a detachable manner, with a maintenance opening being released by detaching the guide vane.

The invention is based on the object of providing a guide vane wheel of a turbomachine which, even with a small cascade pitch, makes it possible to provide access to a borescope.

This problem is solved by a guide vane wheel with the features as disclosed herein. Refinements of the invention are specified herein.

The invention then considers a guide vane wheel of a turbomachine, which has a plurality of guide vanes which form a blade row and are designed to extend radially inward in a flow path of the turbomachine. The guide vane wheel also has two borescope accesses, each of which is formed between two of the guide vanes.

It is provided that the plurality of guide vanes forms two segments, each with a plurality of guide vanes, which are spaced apart from one another in the circumferential direction. The two segments have the same, constant cascade pitch. The two segments are spaced such that the respective outermost guide vane adjoining the respective other segment has an increased circumferential distance from the adjacent guide vane of the other segment, which is equal to 1.3 times to 1.7 times the cascade pitch, where the sum of the increased distances is equal to 3 times the cascade pitch. The increased distance between the two adjacent outermost guide vanes of the two segments in each case provides an enlarged blade passage between these guide vanes. The two borescope accesses are formed in the area of the enlarged blade passages.

According to this, the solution according to the invention is based on the idea of forming two segments, each with a plurality of guide vanes, in a guide vane wheel with a constant pitch, the outermost guide vanes of which (which form the edge of the respective segment) have an increased distance from one another, with the sum of the increased distances being equal to three times the cascade pitch. This corresponds to the fact that in the guide vane wheel provided according to the invention—compared to a guide vane wheel without increased distances—one guide vane has been removed and the two segments use the distance thus gained to provide an increased distance between them. Accordingly, the sum of the increased distances between the two segments is equal to 3 times the cascade pitch (twice the "normal" distance and once the distance gained by removing a guide vane).

The solution according to the invention ensures borescopic access to its interior when the gas generator is reduced in size. It allows a compressor to be photographically scaled while retaining the ability to continue using borescopes and other tools used previously for inspection and maintenance. Two positions are provided for borescope access. In the area of the borescope accesses, the flow is aerodynamically weakened, but supported by the adjacent, unchanged stator blading. The spatial extent of the flow created in this way is therefore small.

It is pointed out that the division of the blading into two segments in a manner as disclosed herein is equivalent to the following design specification for the manufacture of the guide vane wheel. In the case of a guide vane wheel with a row of vanes with a constant pitch around the entire circumference, a vane is removed at any point, so that at a first circumferential position the distance between two vanes corresponds to twice the pitch. At a further position, which may or may not be opposite the first circumferential position, the remaining vane ring is split and divided into two segments. The two segments can be the same size or almost the same size, with "almost the same size" meaning that the two segments differ by only one blade in terms of their number of blades if there is an odd total number of guide vanes.

The two resulting segments are now twisted against each other by 1.3 to 1.7 times the cascade pitch, so that two enlarged blade passages are created at two circumferential positions, the pitch of which is 1.3 to 1.7 times the cascade pitch. For example, the increased distance at one circumferential position corresponds to 1.3 times the cascade pitch and the increased distance at the other circumferential position corresponds to 1.7 times the cascade pitch. In another example, the increased spacing at both circumferential positions is 1.5 times the cascade pitch. The increased distances between the two segments provide sufficient space for the provision of two borescope accesses.

It is pointed out that the increased distance between the two segments is defined in the same way as the pitch, namely as the distance between the leading edges of the blades in the circumferential direction at a considered blade height. In this respect, the increased distance can also be referred to as an increased pitch or as an increased pitch distance.

One embodiment of the invention provides that the two segments are spaced apart in such a manner that the respective outermost guide vane adjoining the respective other segment has an increased distance from the adjacent guide vane of the other segment in the circumferential direction, which is equal to 1.5 times the cascade pitch. The distance between the two segments is thus identical at both circumferential positions.

A further embodiment of the invention provides that the guide vanes of a segment have the same vane profile. It can further be provided that the guide vanes of one segment have the same vane profile as the guide vanes of the other segment. In principle, it is alternatively possible that the vane profiles differ within a segment and/or between the segments in order to break the periodicity of the vane arrangement and thereby generate disturbances which, for example, counteract a so-called rotating separation ("rotating stall").

A further embodiment provides that the two segments have the same number of guide vanes or the number of guide vanes of the two segments differs by only one guide vane (if the total number of guide vanes is odd). This means that the two segments extend over the same circumferential angle or are of the same size.

Alternatively, it can be provided that the two segments have a different number of guide vanes, with the number of guide vanes differing by at least two. Accordingly, the two segments extend over a different circumferential angle or are of different sizes. The size of the segments can be selected in such a manner that the borescope accesses are provided at the required circumferential positions.

According to one embodiment of the invention, it is provided that the borescope accesses to the respective adjacent outermost guide vanes of the two segments are arranged in the rim surface of the guide vane wheel such that the minimum distance to the respective adjacent outermost moving vane is the same. The existing space between two adjacent guide vanes with an increased distance is accordingly optimally used in such a way that the remaining distance between the borescope access and the respective adjacent guide vane is identical on both sides.

It can be provided that the borescope accesses are formed in the axially front area of the respective enlarged vane passage. For example, it is provided that the axially foremost point of the borescope access points is adjacent to a peripheral line that connects the leading edges of the guide vanes of the guide vane wheel.

The borescope accesses are designed, for example, as circular, radially running openings in the guide vane wheel, with other cross-sectional shapes of the borescope access such as an elliptical or rectangular cross-sectional shape also being possible depending on the cross-sectional shape of the shaft of the borescope used.

According to one embodiment, the borescope accesses have a diameter in the range between 5 mm and 8 mm.

In a further aspect of the invention, the invention relates to a gas turbine engine, in particular for an aircraft, with a guide vane wheel according to the invention. Provision may be made here for the gas turbine engine to have:

- an engine core which comprises a turbine, a compressor with a guide vane wheel according to the invention and a turbine shaft which connects the turbine to the compressor and is designed as a hollow shaft;
- a fan which is positioned upstream of the engine core, wherein the fan comprises a plurality of fan blades; and
- a gear box that receives an input from the turbine shaft and outputs drive to the fan so as to drive the fan at a lower rotational speed than the turbine shaft.

One refinement in this regard may provide that

- the turbine is a first turbine, the compressor is a first compressor, and the turbine shaft is a first turbine shaft;
- the engine core further comprises a second turbine, a second compressor, and a second turbine shaft which connects the second turbine to the second compressor; and
- the second turbine, the second compressor, and the second turbine shaft are arranged so as to rotate at a higher rotational speed than the first turbine shaft.

It is pointed out that the present invention is described with reference to a cylindrical coordinate system which has the coordinates x, r, and φ. Herein x indicates the axial direction, r indicates the radial direction, and φ indicates the angle in the circumferential direction. The axial direction herein is defined by the machine axis of the gas turbine engine in which the present invention is implemented, wherein the axial direction points from the engine inlet in the direction of the engine outlet. Proceeding from the x-axis, the radial direction points radially outward. Terms such as "in front of", "behind", "front", and "rear" refer to the axial direction, or the flow direction in the engine. Terms such as "outer" or "inner" refer to the radial direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Assemblies of the present disclosure may be particularly, although not exclusively, beneficial for fans that are driven via a gear box. Accordingly, the gas turbine engine may comprise a gear box that receives an input from the core shaft and outputs drive for the fan so as to drive the fan at a lower rotational speed than the core shaft. The input to the gear box may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect the turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, the second compressor and the second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gear box may be arranged so as to be driven by that core shaft (for example the first core shaft in the example above) which is configured to rotate (for example during use) at the lowest rotational speed. For example, the gear box may be arranged so as to be driven only by the core shaft (for example only by the first core shaft, and not the second core shaft, in the example above) that is configured to rotate (for example during use) at the lowest rotational speed. Alternatively thereto, the gear box may be arranged so as to be driven by one or a plurality of shafts, for example the first and/or the second shaft in the example above.

In the case of a gas turbine engine as described and/or claimed herein, a combustion chamber may be provided axially downstream of the fan and of the compressor(s). For example, the combustion chamber may lie directly downstream of the second compressor (for example at the exit of the latter), when a second compressor is provided. By way of a further example, the flow at the exit of the compressor may be fed to the inlet of the second turbine, when a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (in the sense that their angle of incidence may be variable). The row of rotor blades and the row of stator blades may be axially offset from one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of magnitude of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios can commonly be referred to as the hub-to-tip ratio. The radius at the hub and the radius at the tip can both be measured at the leading peripheral part (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which can simply be double the radius of the fan) may be larger than (or of the order of magnitude of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of a non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about a rotation axis. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading under cruise conditions may be more than (or of the order of magnitude of): 0.3, 0.31, 0.32, 0.33, 0.34, 0.35, 0.36, 0.37, 0.38, 0.39, or 0.4 (wherein all units in this passage are $Jkg^{-1} K^{-1}/(ms^{-1})^2$). The fan tip loading may be in an inclusive range delimited by two of the values in the previous sentence (that is to say that the values may form upper or lower limits).

Gas turbine engines in accordance with the present disclosure may have any desired bypass ratio, wherein the bypass ratio is defined as the ratio of the mass flow rate of the flow through the bypass duct to the mass flow rate of the flow through the core under cruise conditions. In the case of some arrangements, the bypass ratio may be more than (or of the order of magnitude of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). By way of a non-limiting example, the overall pressure ratio of a gas turbine engine as described and/or claimed herein at cruising speed may be greater than (or of the order of magnitude of): 35, 40, 45, 50, 55, 60, 65, 70, 75. The overall pressure ratio may be in an inclusive range delimited by two of the values in the previous sentence (that is to say that the values may form upper or lower limits).

The specific thrust of an engine may be defined as the net thrust of the engine divided by the total mass flow through the engine. The specific thrust of an engine as described and/or claimed herein under cruise conditions may be less than (or of the order of magnitude of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of magnitude of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide vane. At cruising speed, the TET may be at least (or of the order of magnitude of): 1400 K, 1450 K, 1500 K, 1550 K, 1600 K, or 1650 K. The TET at cruising speed may be in an inclusive range delimited by two of the values in the previous sentence (that is to say that the values may form upper or lower limits). The maximum TET during use of the engine may for example be at least (or of the order of magnitude of): 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an aerofoil portion of a fan blade described and/or claimed herein may be manufactured from any suitable material or a combination of materials. For example, at least a part of the fan blade and/or of the aerofoil may be manufactured at least in part from a composite, for example a metal matrix composite and/or an organic matrix composite, such as carbon fiber. By way of a further example, at least a part of the fan blade and/or of the aerofoil may be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a leading periphery of titanium.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of a further example, the fan blades may be formed integrally with a central portion. Such an arrangement may be referred to as a blisk or a bling. Any arbitrary suitable method may be used for production of such a blisk or bling. For example, at least some of the fan blades may be machined from a block and/or at least some of the fan blades may be attached to the hub/disk by welding, such as linear friction welding, for example.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20 or 22 fan blades.

As used herein, cruise conditions can mean cruise conditions of an aircraft to which the gas turbine engine is attached. Such cruise conditions can be conventionally defined as the conditions during the middle part of the flight, for example the conditions experienced by the aircraft and/or the engine between (in terms of time and/or distance) the top of climb and the start of descent.

Purely by way of an example, the forward speed under the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of magnitude of Mach 0.8, of the order of magnitude of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

During use, a gas turbine engine described and/or claimed herein may be operated under the cruise conditions defined elsewhere herein. Such cruise conditions may be determined by the cruise conditions (for example the conditions during the middle part of the flight) of an aircraft to which at least one (for example 2 or 4) gas turbine engine(s) can be fastened in order to provide thrust force.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

The invention will be explained in more detail below on the basis of a plurality of exemplary embodiments with reference to the figures of the drawing. In the drawings.

Figure 1:
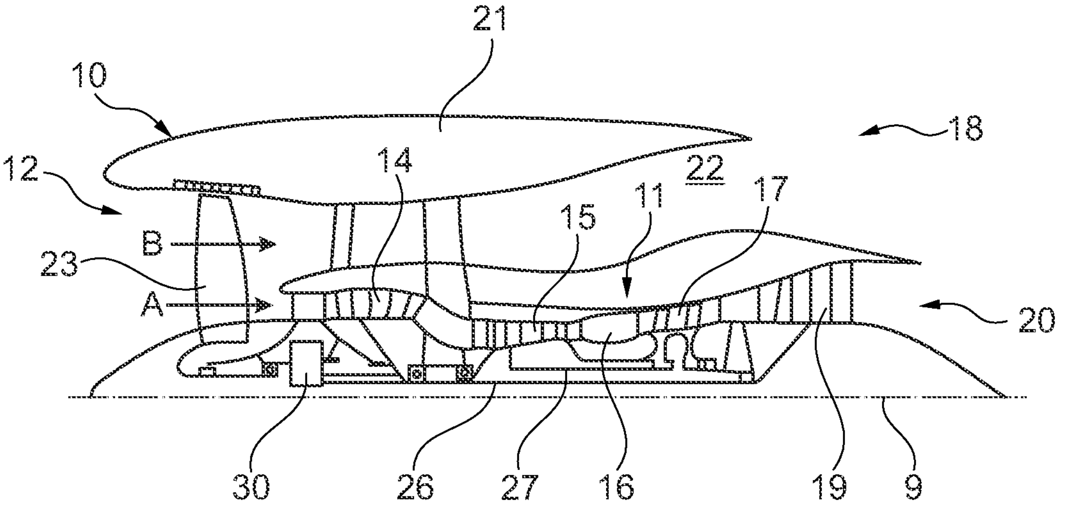
FIG. 1 shows a lateral sectional view of a gas turbine engine.

FIG. 1 illustrates a gas turbine engine 10 having a main rotation axis 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resultant hot combustion products then propagate through the high-pressure and the low-pressure turbine 17, 19 and drive the latter as a result, before said combustion products for providing a specific thrust force are ejected through the nozzle 20. The high-pressure turbine 17 drives the high-pressure compressor 15 by means of a suitable connecting shaft 27. The fan 23 generally provides the major part of the thrust force. The epicyclic gear box 30 is a reduction gear box.

Figure 2:
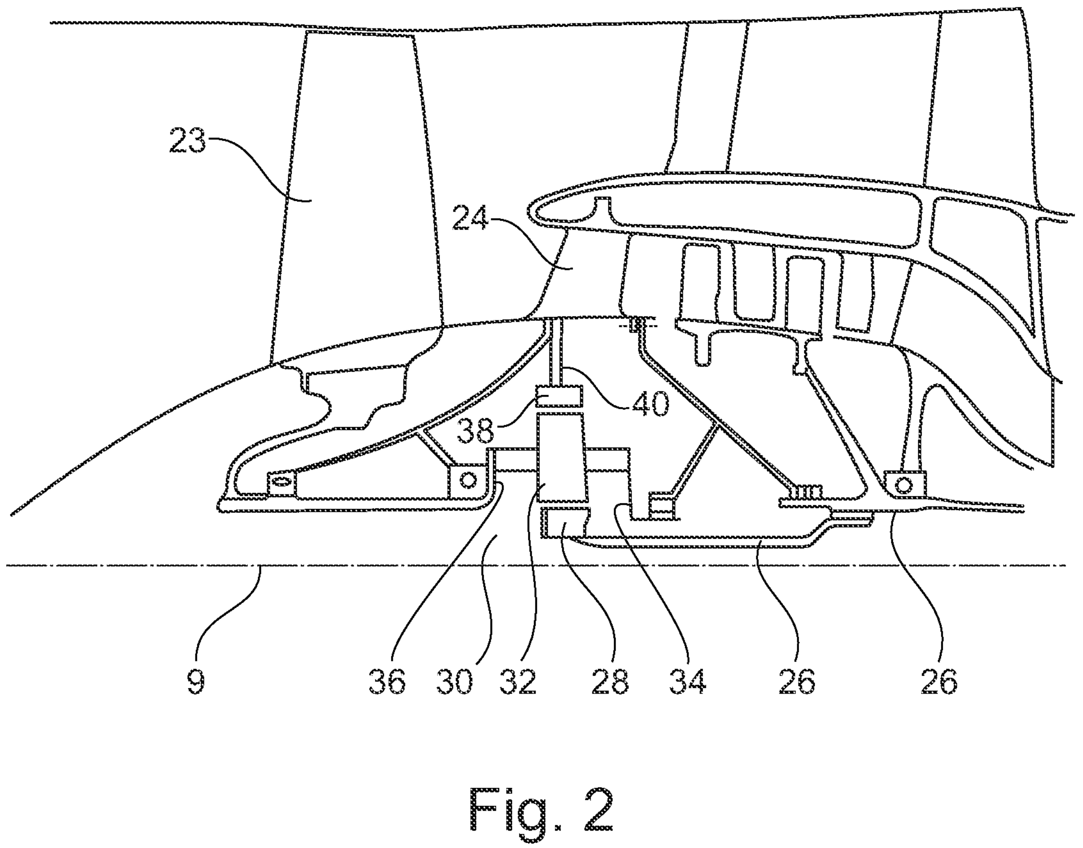
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26 which is coupled to a sun gear 28 of the epicyclic gear box assembly 30. Multiple planet gears 32, which are coupled to one another by a planet carrier 34, are situated radially to the outside of the sun gear 28 and mesh therewith. The planet carrier 34 limits the planet gears 32 to orbiting about the sun gear 28 in a synchronous manner while enabling each planet gear 32 to rotate about its own axis. The planet carrier 34 is coupled by way of linkages 36 to the fan 23 so as to drive the rotation of the latter about the engine axis 9. Radially to the outside of the planet gears 32 and meshing therewith is an outer gear wheel or ring gear 38 that is coupled, by way of linkages 40, to a stationary support structure 24.

It is noted that the terms "low-pressure turbine" and "low-pressure compressor" as used herein can be taken to mean the lowest pressure turbine stage and the lowest pressure compressor stage (that is to say not comprising the fan 23) respectively and/or the turbine and compressor stages that are connected to one another by the connecting shaft 26 with the lowest rotational speed in the engine (that is to say not comprising the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
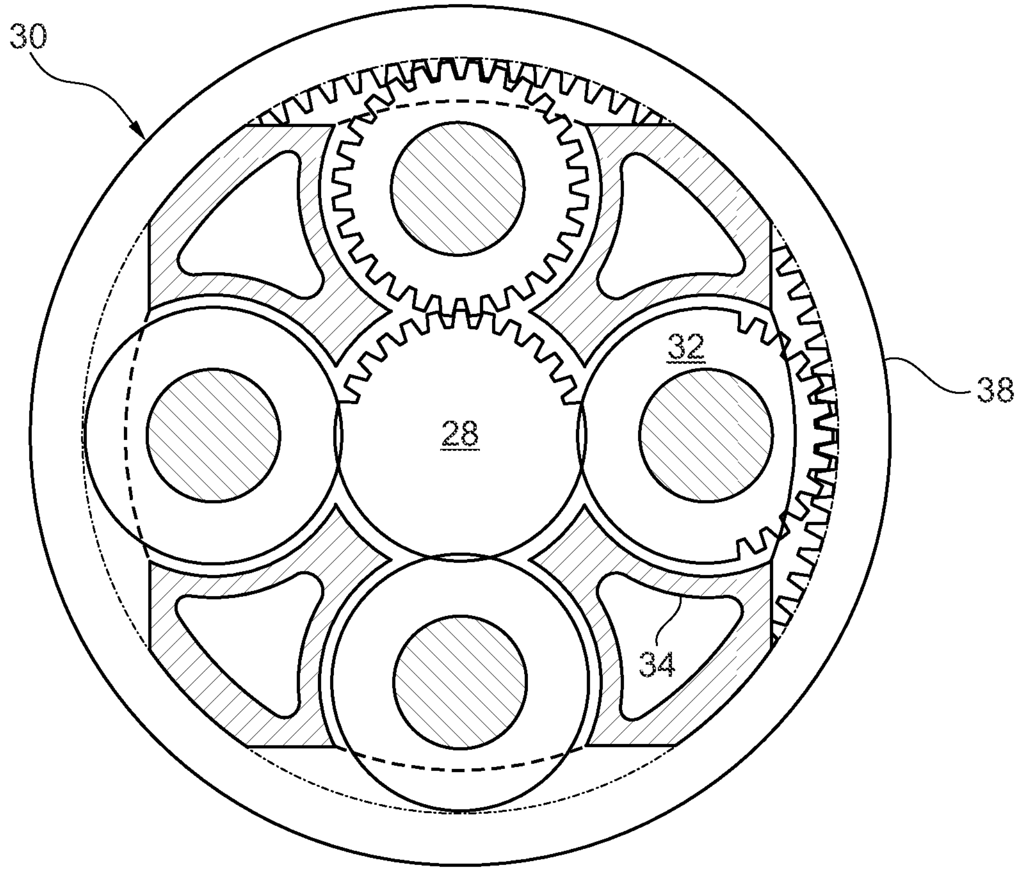
FIG. 3 shows a partially cut-away view of a gear box for a gas turbine engine.

The epicyclic gear box 30 is shown in an exemplary manner in greater detail in FIG. 3. Each of the sun gear 28, the planet gears 32 and the ring gear 38 comprise teeth about their periphery for meshing with the other toothed gears. However, for clarity, only exemplary portions of the teeth are illustrated in FIG. 3. Although four planet gears 32 are illustrated, it will be apparent to a person skilled in the art that more or fewer planet gears 32 may be provided within the scope of protection of the claimed invention. Practical applications of an epicyclic gear box 30 generally comprise at least three planet gears 32.

The epicyclic gear box 30 illustrated by way of example in FIGS. 2 and 3 is a planetary gear box, in which the planet carrier 34 is coupled to an output shaft via linkages 36, wherein the ring gear 38 is fixed. However, any other suitable type of epicyclic gear box 30 can be used. By way of further example, the epicyclic gear box 30 can be a star arrangement, in which the planet carrier 34 is held so as to be fixed, wherein the ring gear (or annulus) 38 is allowed to rotate. In the case of such an arrangement, the fan 23 is driven by the ring gear 38. As a further alternative example, the gear box 30 can be a differential gear box in which the ring gear 38 as well as the planet carrier 34 are allowed to rotate.

It is self-evident that the arrangement shown in FIGS. 2 and 3 is merely an example, and various alternatives fall within the scope of protection of the present disclosure. Purely by way of example, any suitable arrangement can be used for positioning the gear box 30 in the engine 10 and/or for connecting the gear box 30 to the engine 10. By way of a further example, the connections (such as the linkages 36, 40 in the example of FIG. 2) between the gear box and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gear box and the fixed structures, such as the gear box housing) may be used, and the disclosure is not limited to the exemplary arrangement of FIG. 2. For example, where the gear box 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having an arbitrary arrangement of gear box types (for example star-shaped or planetary), support structures, input and output shaft arrangement, and bearing positions.

Optionally, the gear box may drive ancillary and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass duct 22 has its own nozzle, which is separate from the engine core nozzle 20 and is radially outside the latter. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Although the example described relates to a turbofan engine, the disclosure can be applied, for example, to any type of gas turbine engine, such as, for example, an open rotor engine (in which the fan stage is not surrounded by an engine nacelle) or a turboprop engine. In some arrangements, the gas turbine engine 10 potentially does not comprise a gear box 30.

The geometry of the gas turbine engine 10, and components thereof, is/are defined by a conventional axis system, which comprises an axial direction (which is aligned with the rotation axis 9), a radial direction (in the direction from bottom to top in FIG. 1), and a circumferential direction (perpendicular to the view in FIG. 1). The axial, radial and circumferential directions are perpendicular to one another.

In the context of the present invention, the design of the guide vane wheels or stators in the compressor or alternatively in the turbine is important.

Figure 4:
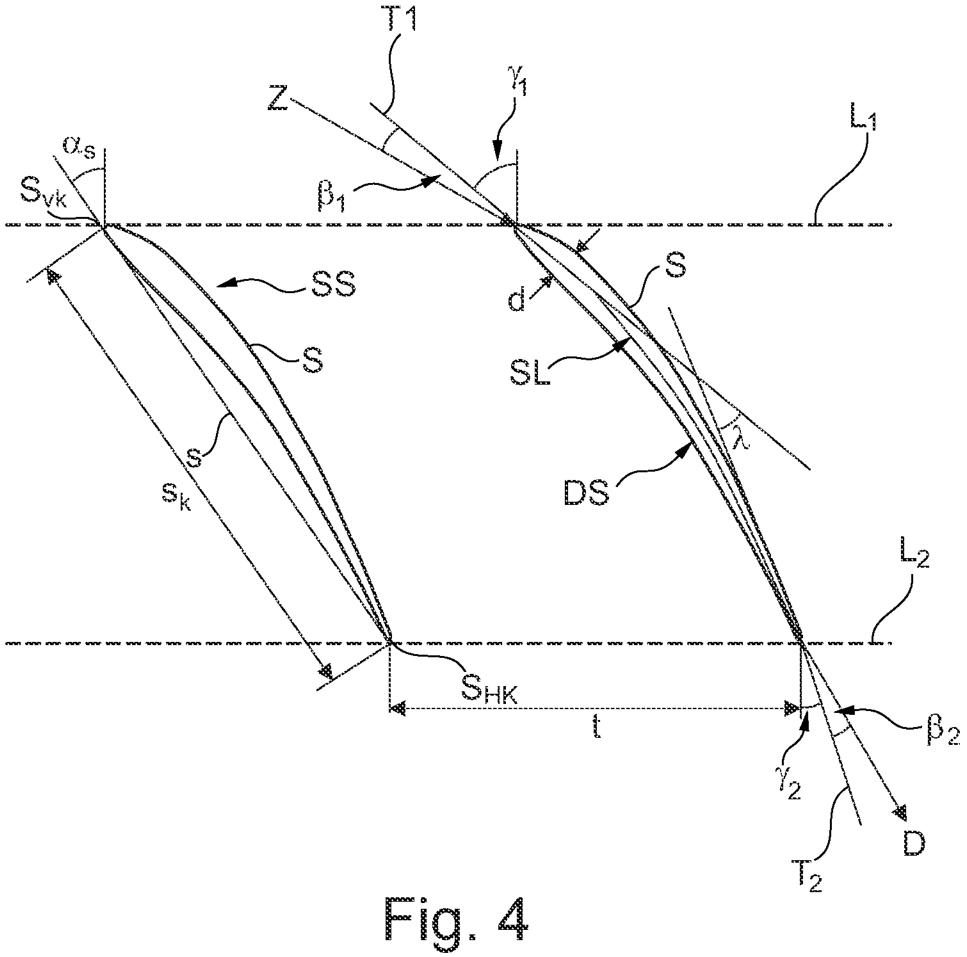
FIG. 4 shows the basic geometric construction and the basic designations in a compressor cascade.

The basic construction of a compressor cascade will firstly be described on the basis of FIG. 4. The compressor cascade is illustrated in a conventional illustration in meridional section and in a developed view. Said compressor cascade comprises a multiplicity of blades S, which each have a leading edge $S_{VK}$ and a trailing edge $S_{HK}$. The leading edges $S_{VK}$ lie on an imaginary line $L_1$, and the trailing edges $S_{HK}$ lie on an imaginary line $L_2$. The lines $L_1$ and $L_2$ run parallel. The blades S furthermore each comprise a suction side SS and a pressure side DS. Their maximum profile thickness is denoted by d.

The compressor cascade has a cascade pitch cascade pitch t and a profile chord s with a profile chord length $s_k$. The cascade pitch t is the distance between the blades S in the circumferential direction. The cascade pitch is the same at the cascade entrance and at the cascade exit. The profile chord s is the connecting line between the leading edge $S_{VK}$ and the trailing edge $S_{HK}$ of the profile. The blade stagger angle (hereinafter referred to as stagger angle) $\alpha_s$ is formed between the profile chord s and the perpendicular to the line $L_1$ (wherein the perpendicular at least approximately corresponds to the direction defined by the machine axis). The stagger angle $\alpha_s$ indicates the inclination of the blades S.

The blades S have a camber line SL, which is also referred to as profile centerline. This is defined by the connecting line of the circle center points inscribed into the profile. The tangent to the camber line SL at the leading edge is denoted by $T_1$. The tangent to the camber line SL at the trailing edge is denoted by $T_2$. The angle at which the two tangents $T_1$, $T_2$ intersect is the blade camber angle A. The inflow direction, at which gas flows into the cascade, is denoted by Z, and the outflow direction, at which gas flows away from the cascade, is denoted by D. The incidence angle $\beta_1$ is defined as the angle between the tangents $T_1$ and the inflow direction Z. The deviation angle $\beta_2$ is defined as the angle between the tangents $T_2$ and the outflow direction A. The blade exit angle $\gamma_1$ is defined as the angle between the tangents $T_1$ to the skeletal line SL and the perpendicular to the line $L_1$. The blade exit angle $\gamma_2$ is defined as the angle between the tangent $T_2$ to the camber line SL and the perpendicular to the line $L_2$.

In the context of the present invention, the cascade pitch t is important. It is pointed out that the cascade pitch t can depend on the radial height of the cascade section, depending on the shape of the guide vanes, i.e. the cascade pitch t can be different depending on whether a case cut, a center cut or a blade tip cut is considered. Within the scope of the present description and disclosure, the housing section is considered, but another section can also be considered.

Figure 5:
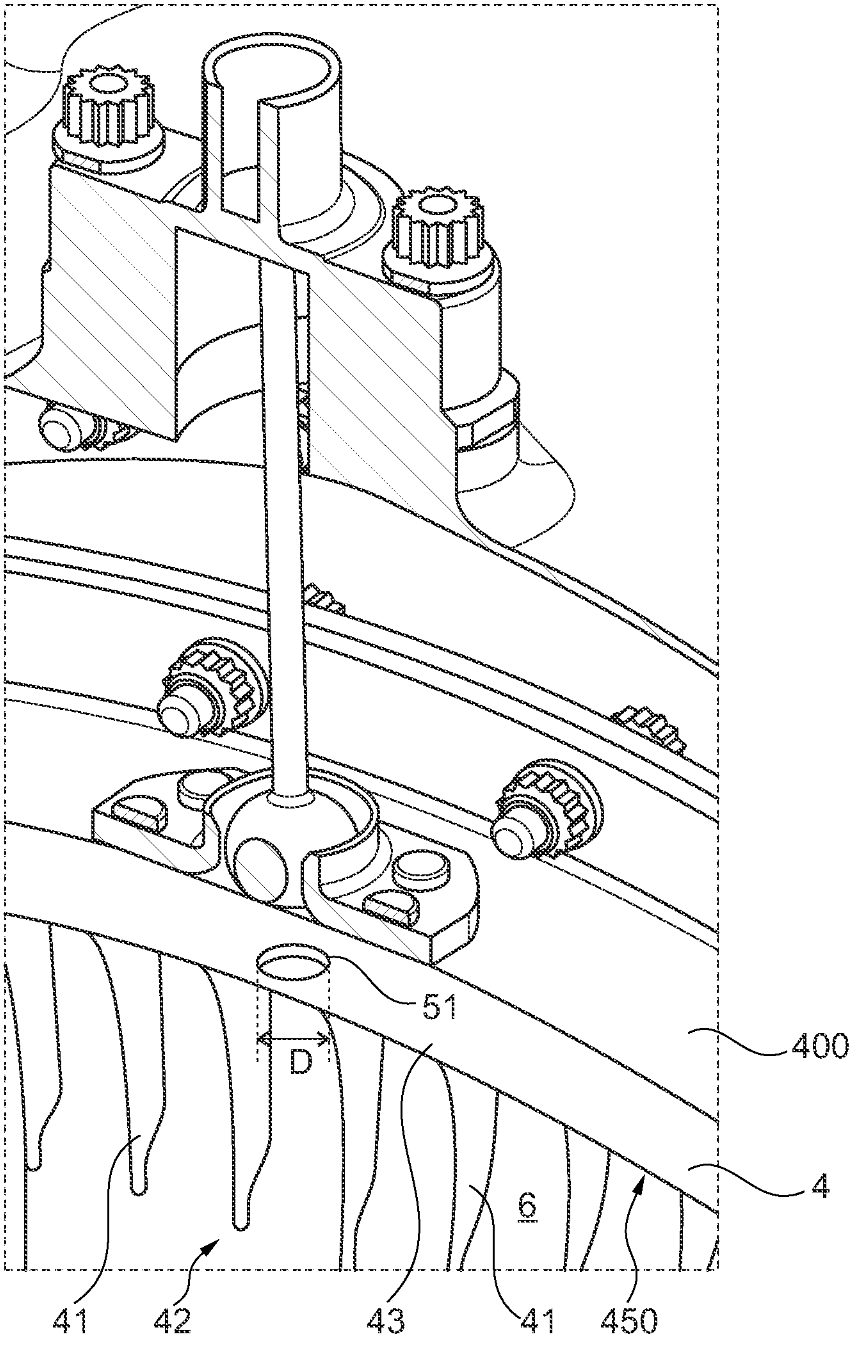
FIG. 5 shows a perspective view of a compressor housing which comprises a plurality of guide vane wheels, each with a row of guide vanes.

FIG. 5 shows a partially sectioned view of the compressor housing 400 of a compressor of a gas turbine engine, for example the compressor housing of the low-pressure compressor 14 or the high-pressure compressor 15 of the gas turbine engine of FIG. 1, which delimits the main flow path 6 through the core engine radially on the outside. The compressor housing 400 includes a plurality of guide vane wheels 4, each having a plurality of guide vanes 41, each forming a row of vanes 42. The guide vanes 41 extend radially inward into the main flow path 6.

Rotors are not shown, which are arranged in a manner known per se between the guide vane wheels 4 and which delimit the main flow path 6 radially on the inside, so that the main flow path 6 is formed by an annular space.

On each guide vane wheel 4, the guide vanes 41 extend radially inward, starting from a wall 43, the wall 43 forming part of the compressor housing 400. On its inner side facing the main flow path 6, the wall 43 forms a crown surface 450, from which the guide vanes 41 extend.

Provision can be made for the guide vanes 41 to be adjustable in their staggering angle in a manner known per se.

FIG. 5 also shows that in one of the guide vane wheels 4, namely in its wall 43, a borescope access 51 is formed. The borescope access 51 is arranged in the circumferential direction in such a manner that it is located between two guide vanes 41. The borescope access 51 has a circular cross-section and forms a radial opening in the guide vane wheel 4 or its wall 43. The borescope access 51 is used to receive a borescope (not shown) for inspection or maintenance purposes. In this case, the borescope access 51 has a diameter D that is normalized and is, for example, in the range between 5 mm and 8 mm.

Figure 6:
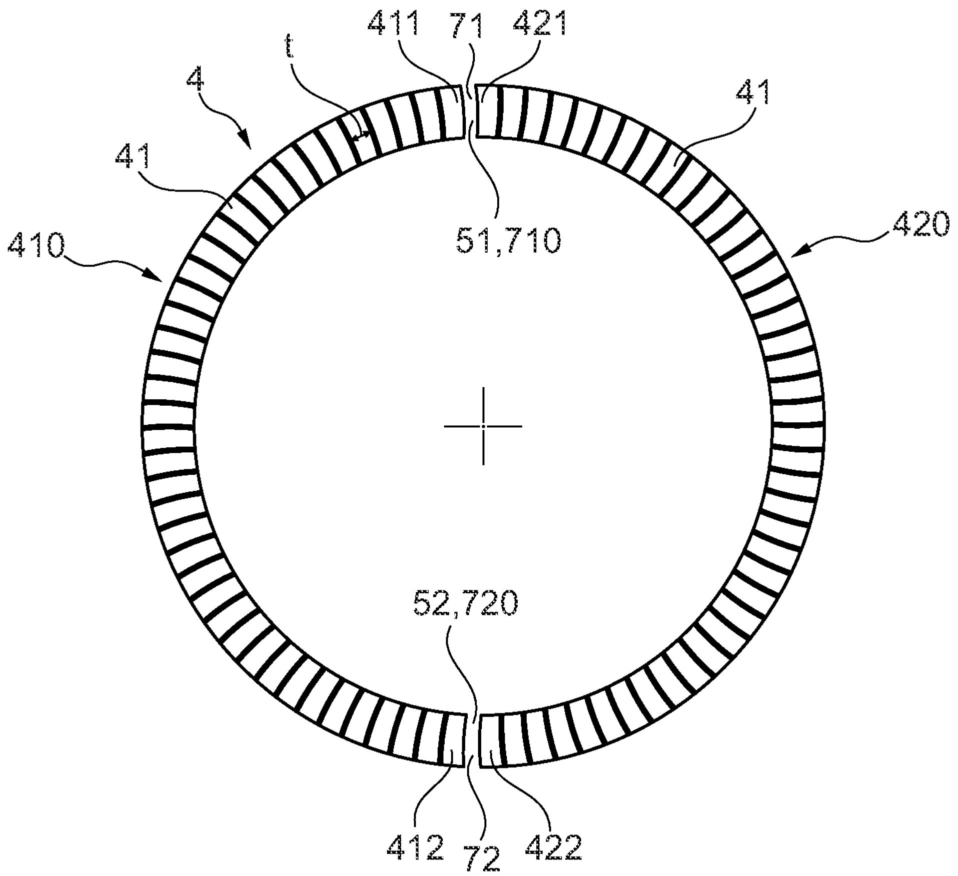
FIG. 6 shows an exemplary embodiment of a guide vane wheel comprising two segments which are separated from one another by regions of increased circumferential spacing.

FIG. 6 shows an exemplary embodiment of a guide vane wheel 4 which forms two borescope accesses 51, 52 which are realized at spaced-apart circumferential positions of the guide vane wheel 4.

The plurality of guide vanes 41 of the guide vane wheel 4 form two segments 410, 420 of guide vanes, the two segments 410, 420 being spaced apart from one another in the circumferential direction. It is provided that both segments 410, 420 have the same, constant cascade pitch t.

It can be provided that the guide vanes 41 of the two segments 410, 420 are of identical design, in particular have the same vane profile. However, this is not necessarily the case. Alternatively, it can be provided that the vane profiles vary within one or both segments 410, 420, or that vane profiles of different design are realized in the two segments 410, 420.

One segment 410 has two outermost guide vanes 411, 412 adjoining the other segment 420. In a corresponding manner, the other segment 420 has two outermost guide vanes 421, 422 adjoining the one segment 410. The adjacent guide vanes 411, 421 and 412, 422 of the two segments 410, 420 are spaced apart in such a manner that the distance 71, 72 existing between these guide vanes 411, 421 and 412, 422 in the circumferential direction is larger than the distance defined by the pitch t. Thus, the distance 71 is equal to 1.3 to 1.7 times the cascade pitch t. The distance 72 is equal to 1.7 to 1.3 times the cascade pitch t. The sum of the distances 71, 72 is equal to three times the cascade pitch, as will be explained below.

In this case, an embodiment variant provides that the distances 71, 72 are identical and equal to 1.5 times the cascade spacing t.

Due to the increased distance 71, 72 between the adjacent outermost guide vanes 411, 412, 421, 422 of the two segments 410, 420, an enlarged vane passage 710, 720 is provided between these guide vanes 411, 412, 421, 422 in each case. It is provided that the two borescope accesses 51, 52 are formed in the area of the enlarged vane passages 710, 720. As explained with reference to FIG. 5, they extend in the wall 43 of the guide vane wheel 4 in the region between the guide vanes 411, 412, 421, 422 under consideration.

The enlarged vane passage 710, 720 enables the formation of borescope accesses 51, 52 even with guide vane wheels which are formed in small gas generators and in which the guide vanes have only a small spacing in the circumferential direction.

The distance described between the outermost guide vanes of the two segments 410, 420 corresponds to a design principle that is explained with reference to FIGS. 7 and 8.

Figure 7:
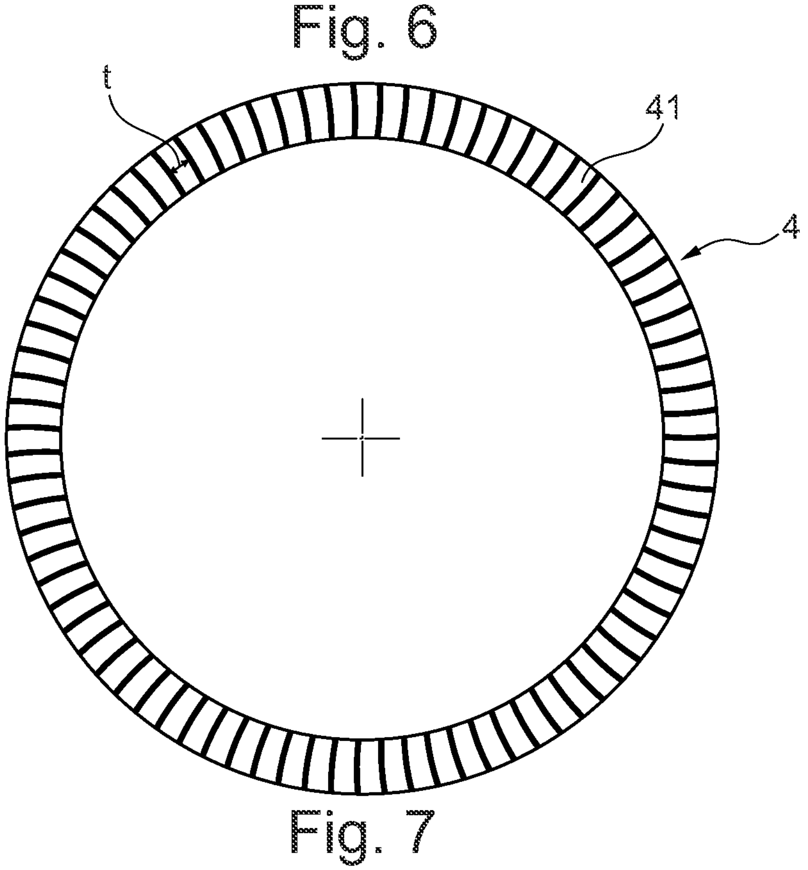
FIG. 7 shows a guide vane wheel according to the prior art with a constant pitch over the entire guide vane wheel.
Figure 8:
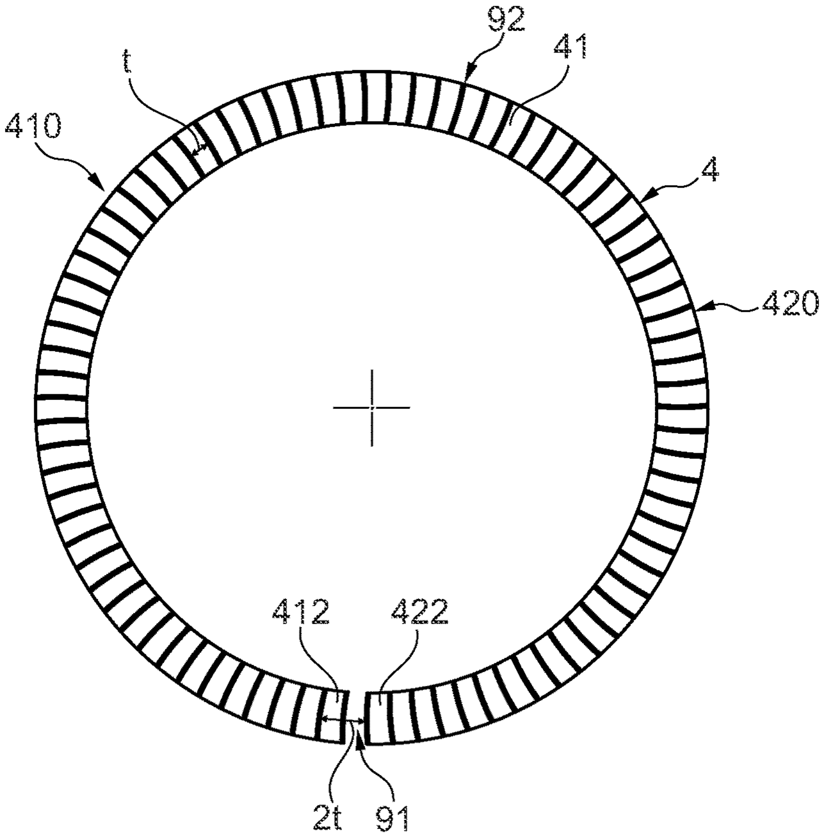
FIG. 8 shows a guide vane wheel according to FIG. 7, in which a guide vane has been removed.

FIG. 7 shows a conventionally designed guide vane wheel 4 with a large number of guide vanes 41 with a constant pitch t around the entire circumference. The construction of the guide vane wheel of FIG. 6 corresponds to the following procedure. According to FIG. 8, a vane is removed from any first position 91 of the vane row. This means that at this position 91 the distance between two vanes 412, 422 corresponds to twice the pitch 2*t*.

At a further position 92, which may (but is not necessarily the case) be opposite the first position 91, the remaining vane ring is divided into two segments 410,420. These two segments 410, 420 are rotated relative to one another by half a pitch so that, according to FIG. 6, there are two enlarged vane passages 710, 720 at two circumferential positions, the pitch of which corresponds to 1.5 times the pitch t between the remaining guide vanes 41. The sum of the increased distances in the area of the enlarged vane passages 710, 720 is therefore equal to 3 times the pitch t. This is immediately clear to the extent that the "normal" pitch between two guide vanes was increased by a factor of 1.5 in each case. Alternatively, the increased distances in the blade passages 710, 720 may be different, but the sum of these distances will still be equal to 3 times the pitch.

In the area of the enlarged vane passages 710, 720, the borescope accesses 51, 52 are formed.

The construction of the guide vane wheel of FIG. 6 explained above is of course only to be understood conceptually. The guide vane wheel of FIG. 6 is produced with the enlarged vane passages 710, 720 and the borescope accesses 51, 52 formed therein.

Figure 9:
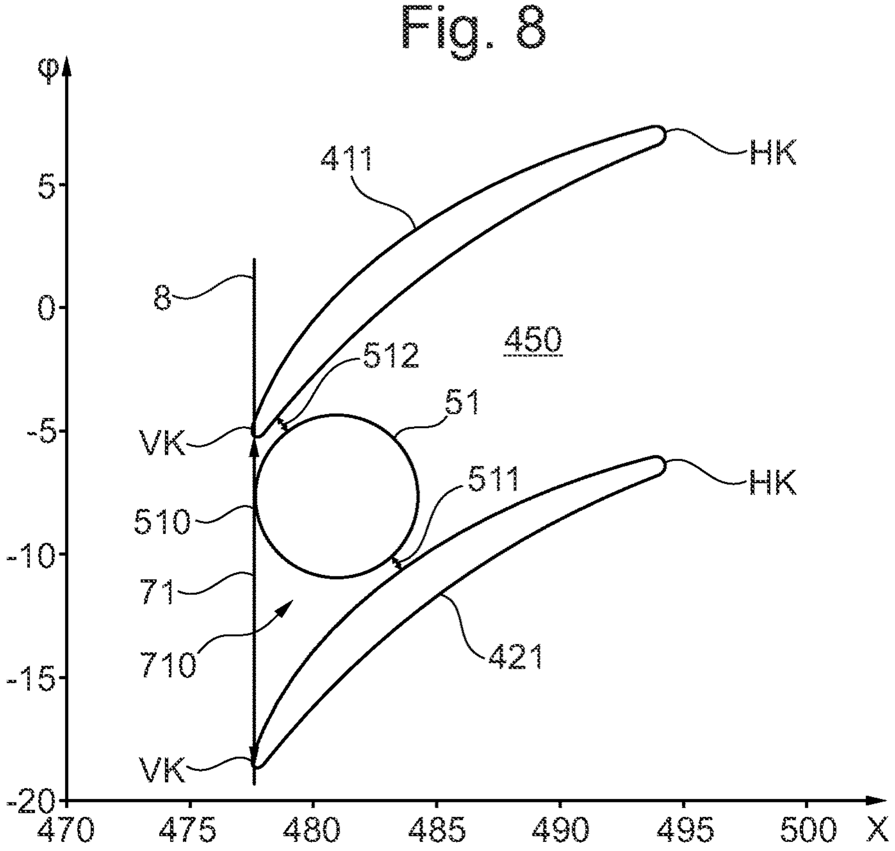
FIG. 9 shows a schematic representation of the arrangement of a borescope access between two guide vanes in a guide vane wheel according to FIG. 6.

FIG. 9 shows an unrolled illustration in the housing section of the area of the wall in the enlarged blade passage between the two segments 410, 420 explained with reference to FIG. 6. The outermost, i.e. the guide vane 411 located at one edge of one segment 410 and the adjacent outermost, i.e. the guide vane 421 located at one edge of the other segment 420 are shown. Each guide vane 411, 412 has a leading edge VK and a trailing edge HK. The leading edges VK of all guide vanes 41 lie on an imaginary circumferential line 8.

The wall forms on the inside, i.e. adjacent to the main flow path through the compressor, a rim surface 450 from which the guide vanes 411, 421 extend radially inward.

A vane channel or a vane passage 710 is formed between the two guide vanes 411, 421. The vane passage 710 is larger than the vane passage formed by two guide vanes 41 in each of the two segments 410, 420. The distance 71 between the two guide vanes 411, 421 is equal to 1.5 times the pitch tin the area of the segments 410, 420.

The distance 71 is considered in the same way as the pitch, for example in the housing section, i.e. in a section immediately adjacent to the rim surface 450. In other sections, the pitch t may have a different value, but the increase in the distance by the factor of 1.5 remains the same.

In the area of the rim surface 450 between the two guide vanes 411, 421, one borescope access 51 is formed. It is arranged centrally between the two guide vanes 411, 421 insofar as the minimum distance 511, 512 from the respectively adjacent guide vane 411, 421 is the same. The further borescope access 52 is also designed in a corresponding manner.

Furthermore, in the exemplary embodiment shown, but not necessarily, the borescope access 51 is formed in the axially front area of the enlarged vane passage 710. The axially foremost point 510 of the borescope access 51 is adjacent to the peripheral line 8 which connects the leading edges VK of the guide vanes 41 of the guide vane wheel. In alternative embodiment variants, the borescope access 51 is arranged centrally between the leading edge VK and the trailing edge HK of the vanes 411, 421 or even more to the trailing edge HK of the vanes 411, 421 with regard to its axial position.

It will be apparent that the invention is not restricted to the embodiments described above, and various modifications and improvements can be undertaken without departing from the concepts described here. For example, the position of the borescope access in the vane passage between the peripheral vanes of the two segments can be implemented at a different location than shown. The extent of the circumference and the number of vanes of the two segments are also to be understood merely as examples.

It is furthermore pointed out that any of the features described can be used separately or in combination with any other features, unless they are mutually exclusive. The disclosure extends to and comprises all combinations and sub-combinations of one or a plurality of features which are described here. If ranges are defined, said ranges thus comprise all of the values within said ranges as well as all of the partial ranges that lie within a range.

The invention claimed is:

1. A guide vane wheel of a turbomachine, comprising:

a plurality of guide vanes which form a vane rower and are configured to extend radially inward in a flow path of the turbomachine, and two borescope accesses, each formed between two of the vanes, the plurality of guide vanes forming two segments, each with a plurality of the guide vanes, which are spaced apart from one another in a circumferential direction, the two segments having a same constant cascade pitch, the two segments being spaced apart such that a respective outermost one of the guide vanes of one of the two segments adjoining the other of the two segments is at an increased distance from an adjacent one of the guide vanes of the other of the two segments in the circumferential direction which is equal to 1.3 to 1.7 times the cascade pitch, the sum of the increased distances being equal to 3 times the cascade pitch, the increased distance between the respective two adjacent outermost guide vanes of the two segments each providing an enlarged vane passage between two adjacent outermost guide vanes, and the two borescope accesses being formed respectively in areas of the enlarged vane passages.

2. The guide vane wheel as claimed in claim 1, wherein the two segments are spaced apart such that the respective outermost guide vane adjoining the respective other segment is at an increased distance from the adjacent guide vane of the other segment in the circumferential direction which is equal to 1.5 times the cascade pitch.

3. The guide vane wheel as claimed in claim 1, wherein the guide vanes of one of the two segments have a same vane profile.

4. The guide vane wheel as claimed in claim 3, wherein the guide vanes of one of the two segments has the same vane profile as the guide vanes of the other of the two segments.

5. The guide vane wheel as claimed in claim 1, wherein the two segments each have a same number of guide vanes or the number of guide vanes of the two segments differs by only one guide vane.

6. The guide vane wheel as claimed in claim 1, wherein the two segments have a different number of guide vanes, the number of guide vanes differing by at least two.

7. The guide vane wheel as claimed in claim 1, wherein the two borescope accesses are arranged in a rim surface of the guide vane wheel with respect to the respective adjacent outermost guide vanes of the two segments such that a minimum distance to the respective adjacent outermost guide vane is the same.

8. The guide vane wheel as claimed in claim 1, wherein the two borescope accesses are formed in an axially front area of the respective enlarged vane passage.

9. The guide vane wheel as claimed in claim 1, wherein an axially foremost point of the two borescope accesses adjoins a peripheral line which connects leading edges of the guide vanes of the guide vane wheel.

10. The guide vane wheel as claimed in claim 1, wherein the two borescope accesses are configured as openings in the guide vane wheel which are circular or elliptical in cross-section and run radially.

11. The guide vane wheel as claimed in claim 1, wherein the two borescope accesses each have a diameter in a range between 5 mm and 8 mm.

12. A gas turbine engine comprising:

an engine core which comprises a turbines, a compressor having the guide vane wheel as claimed in claim 1, and a turbine shaft which is configured as a hollow shaft and connects the turbine to the compressor;

a fan, which is positioned upstream of the engine core, wherein the fan comprises a plurality of fan blades; and a gear box that receives an input from the turbine shaft and outputs drive for the fan to drive the fan at a lower rotational speed than the turbine shaft.

* * * * *